United States Patent
Jardine et al.

(10) Patent No.: US 7,308,605 B2
(45) Date of Patent: Dec. 11, 2007

(54) LATENT ERROR DETECTION

(75) Inventors: Robert L. Jardine, Cupertino, CA (US); David L. Bernick, Ben Lomond, CA (US); Thomas A. Heynemann, Boulder Creek, CA (US); James R. Smullen, Carmel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 599 days.

(21) Appl. No.: 10/894,825

(22) Filed: Jul. 20, 2004

(65) Prior Publication Data

US 2006/0020850 A1 Jan. 26, 2006

(51) Int. Cl.
*G06F 11/00* (2006.01)

(52) U.S. Cl. .................................. 714/11; 714/797

(58) Field of Classification Search .............. 714/11, 714/797
See application file for complete search history.

(56) References Cited

U.S. PATENT DOCUMENTS

| | | | |
|---|---|---|---|
| 4,228,496 A | | 10/1980 | Katzman et al. |
| 4,503,535 A | * | 3/1985 | Budde et al. ............... 714/47 |
| 4,982,402 A | * | 1/1991 | Beaven et al. .............. 714/15 |
| 5,140,594 A | * | 8/1992 | Haulin ..................... 714/797 |
| 5,146,585 A | | 9/1992 | Smith, III |
| 5,255,367 A | * | 10/1993 | Bruckert et al. ............. 714/11 |
| 5,295,258 A | * | 3/1994 | Jewett et al. ............... 714/12 |
| 5,572,620 A | | 11/1996 | Reilly et al. |
| 5,572,662 A | * | 11/1996 | Ohta et al. ................. 714/11 |
| 5,574,849 A | * | 11/1996 | Sonnier et al. .............. 714/12 |
| 5,613,127 A | | 3/1997 | Schultz |
| 5,812,757 A | * | 9/1998 | Okamoto et al. ............. 714/11 |
| 6,397,365 B1 | | 5/2002 | Brewer et al. |
| 7,017,073 B2 | * | 3/2006 | Nair et al. ................. 714/11 |
| 2002/0152420 A1 | * | 10/2002 | Chaudhry et al. ............ 714/11 |
| 2002/0194532 A1 | * | 12/2002 | Nagasawa .................. 714/11 |
| 2004/0078650 A1 | * | 4/2004 | Safford et al. .............. 714/11 |
| 2005/0246581 A1 | * | 11/2005 | Jardine et al. .............. 714/12 |

OTHER PUBLICATIONS

Chen, Chung-Ho, et al. "Fault-Containement in Cache Memories for TMR Redundnant Processor Systems" IEEE Apr. 1999.*

* cited by examiner

*Primary Examiner*—Bryce P Bonzo

(57) ABSTRACT

In an implementation of latent error detection, memory regions that each correspond to a different processor element of a redundant processor system are scanned for latent processing errors maintained as erroneous data. The data maintained in the memory regions is compared to detect a latent processing error in a first memory region. The latent processing error is resolved by copying data from a second memory region into the first memory region where the data maintained in the second memory region is determined to be identical to data maintained in at least a third memory region.

39 Claims, 5 Drawing Sheets

LATENT ERROR DETECTION

TECHNICAL FIELD

This invention relates to latent error detection.

BACKGROUND

Multiple redundant processor systems are implemented as fault-tolerant systems to prevent downtime, system outages, and to avoid data corruption. A multiple redundant processor system provides continuous application availability and maintains data integrity such as for stock exchange systems, credit and debit card systems, electronic funds transfers systems, travel reservation systems, and the like. In these systems, data processing computations are performed on multiple, independent processing elements and the results are compared to each other to detect processing errors.

A redundant processor system can generate processing errors that are written to memory and stored as erroneous data that remains undetected until an input/output operation is initiated, such as a write to disk or to a communications line. Erroneous data may also be detected if the independent processing elements test and branch on the erroneous data and then perform some other comparative operation. Alternatively, the undetected erroneous processing data may never be detected if the data is not requested and/or if the memory location that stores the erroneous processing data is written over.

These undetected, or latent, errors in a redundant processor system, however, can be unknowingly perpetuated. For example, in a triplex redundant processor system, a first processor may write a data error to a first memory location in a memory region that corresponds to the first processor. Additionally, a second processor may write a data error to a second memory location in a memory region that corresponds to the second processor. If the erroneous data is not requested via an input/output operation, or otherwise compared, the two processing errors are stored undetected as erroneous data in the different redundant memory locations.

If the third processor of the system fails, and is subsequently removed and replaced, the third processor and a corresponding memory region is reintegrated into the redundant processor system. The memory region corresponding to the first or second processor is copied into the replaced memory region corresponding to the third processor. If the first memory region is copied into the replaced memory region, for example, then the first processor data error written to the first memory location is also copied into the replaced memory region.

When an input/output operation is initiated at the first memory location of the redundant memory regions, the data in each memory region at the first memory location will be compared to determine which is the correct data. The erroneous data in the first memory region and the copied erroneous data in the replaced memory region will be compared and determined to be the correct data by a voting operation (e.g., ⅔), while the actual correct data in the second memory region will be determined to be the erroneous data.

BRIEF DESCRIPTION OF THE DRAWINGS

The same numbers are used throughout the drawings to reference like features and components.

DETAILED DESCRIPTION

The following describes embodiments of latent error detection. Error detection logic is implemented to periodically scan memory regions for latent processing errors and/or latent memory errors. The memory regions each correspond to a different processor element of a logical processor in a redundant processor system. A latent processing error can be stored in a memory region when an associated processor element executes an instruction set and outputs data that is different from the data output of redundant processor elements that execute the same instruction set. A latent processing error can be detected by comparing data from two or more of the redundant memory regions to determine that a data error exists. The correct data can be determined by comparing data from three or more redundant memory regions, and then the data error can be resolved by copying the correct data to replace the latent processing error.

A latent memory error can be stored in a memory region as a data corruption error in the memory region itself. Latent memory errors can be single-bit data errors or multiple-bit data errors and are identified in memory by an error correcting code. The error detection logic resolves a single-bit data error according to the error correcting code that identifies the latent memory error. To resolve a multiple-bit data error, the correct data is copied from one of the other redundant memory regions to replace the latent memory error detected in the memory region as a multiple-bit data corruption error.

Although embodiments of latent error detection may be implemented in various redundant processor systems, latent error detection is described with reference to the following processing environment.

Figure 1:
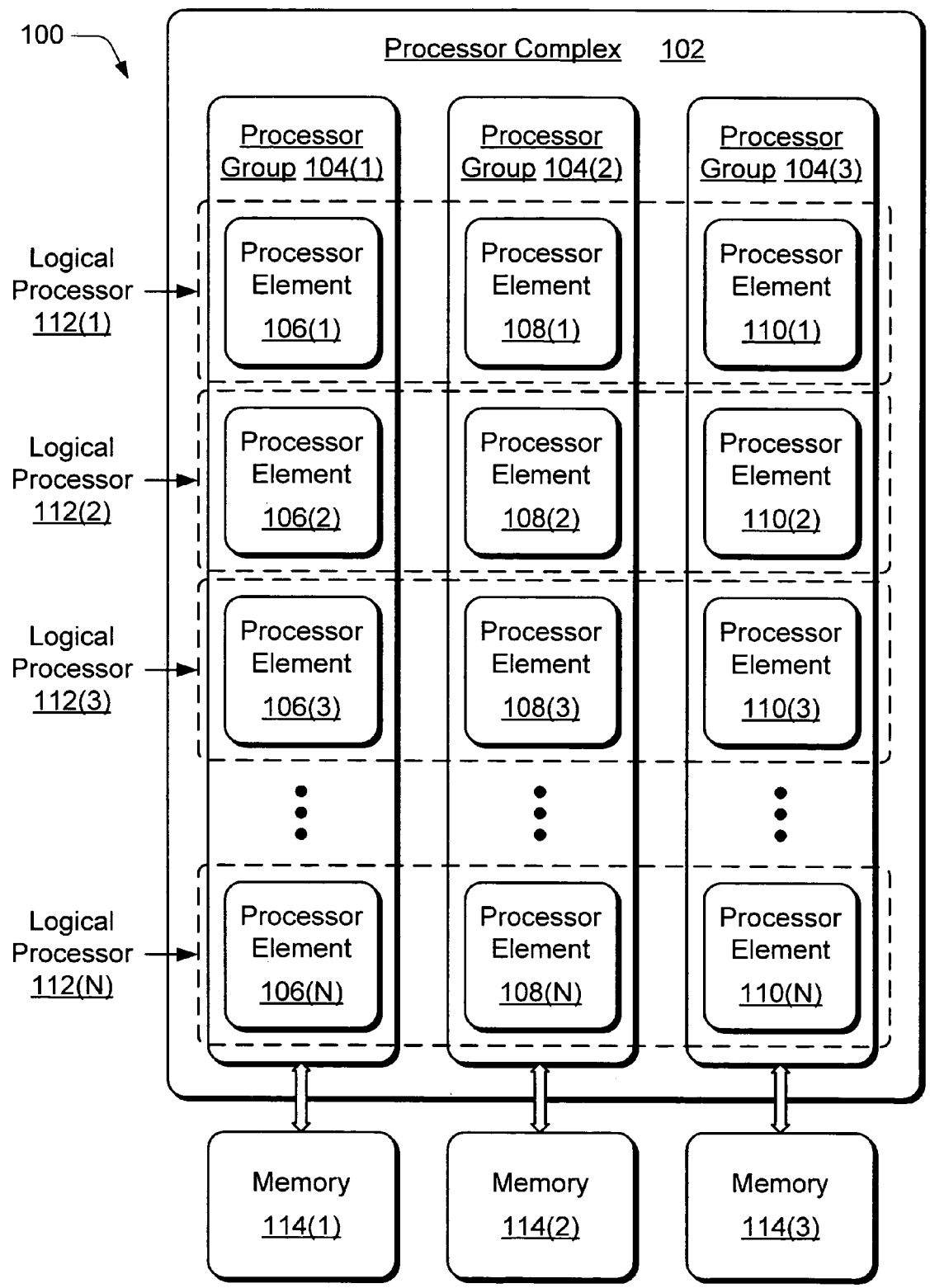
FIG. 1 illustrates an exemplary redundant processor system in which an embodiment of latent error detection can be implemented.

FIG. 1 illustrates an example of a redundant processor system 100 in which an embodiment of latent error detection can be implemented. The redundant processor system 100 includes a processor complex 102 which has processor groups 104(1-3). Each processor group 104 includes any number of processor elements which are each a microprocessor that executes, or processes, computer executable instructions. Processor group 104(1) includes processor elements 106(1-N), processor group 104(2) includes processor elements 108(1-N), and processor group 104(3) includes processor elements 110(1-N). Although the processor complex 102 includes only three processor groups 104(1-3) in this embodiment of latent error detection, a processor complex may include two, four, or any other combination of processor groups.

Processor elements, one each from the processor groups 104(1-3), are implemented together as a logical processor 112(1-N). For example, a first logical processor 112(1) includes processor element 106(1) from processor group 104(1), processor element 108(1) from processor group 104(2), and processor element 110(1) from processor group 104(3). Similarly, logical processor 112(2) includes processor elements 106(2), 108(2), and 110(2), while logical processor 112(3) includes processor elements 106(3), 108(3), and 110(3).

The three processor elements combine to implement a logical processor 112 and cooperate to perform the computations of the logical processor 112. Logical computations for an input/output operation or an interprocessor communication are executed separately three times in a logical processor 112, once each in the three processor elements of the logical processor. Additionally, the three processor elements in a logical processor 112 can coordinate and synchronize with each other to exchange data, replicate input data, and vote on input/output operations and communication outputs.

Each processor group 104(1-3) has an associated memory component 114(1-3), respectively. A memory component 114 can be implemented as any one or more memory components, examples of which include random access memory (RAM), DRAM, SRAM, a disk drive, and the like. Although the memory components 114(1-3) are illustrated as independent components, each processor group 104 can include a respective memory component 114 as an integrated component in an alternate embodiment.

In this example, processor complex 102 is a triplex redundant processor system having triple modular redundancy in that each logical processor 112 includes three redundant processor elements. A faulty processor element can be replaced and reintegrated into the system while the redundant processor system 100 remains on-line without a loss of processing capability to provide data integrity.

The processor elements of a logical processor 112 are loosely synchronized in a loose lock-step implementation such that instructions may be executed, or processed, in each of the processor elements at a slightly different time. This implementation provides that the logical processors can execute instructions faster than a typical tight lock-step configuration because the processor elements and logical processors 112 are not restricted to synchronized code execution. This implementation also provides for non-deterministic execution among the processor elements in a logical processor 112, such as non-deterministic branch prediction, cache replacement algorithms, and the like. The individual processor elements can also perform independent error recovery without losing synchronization with the other processor elements.

Figure 2:
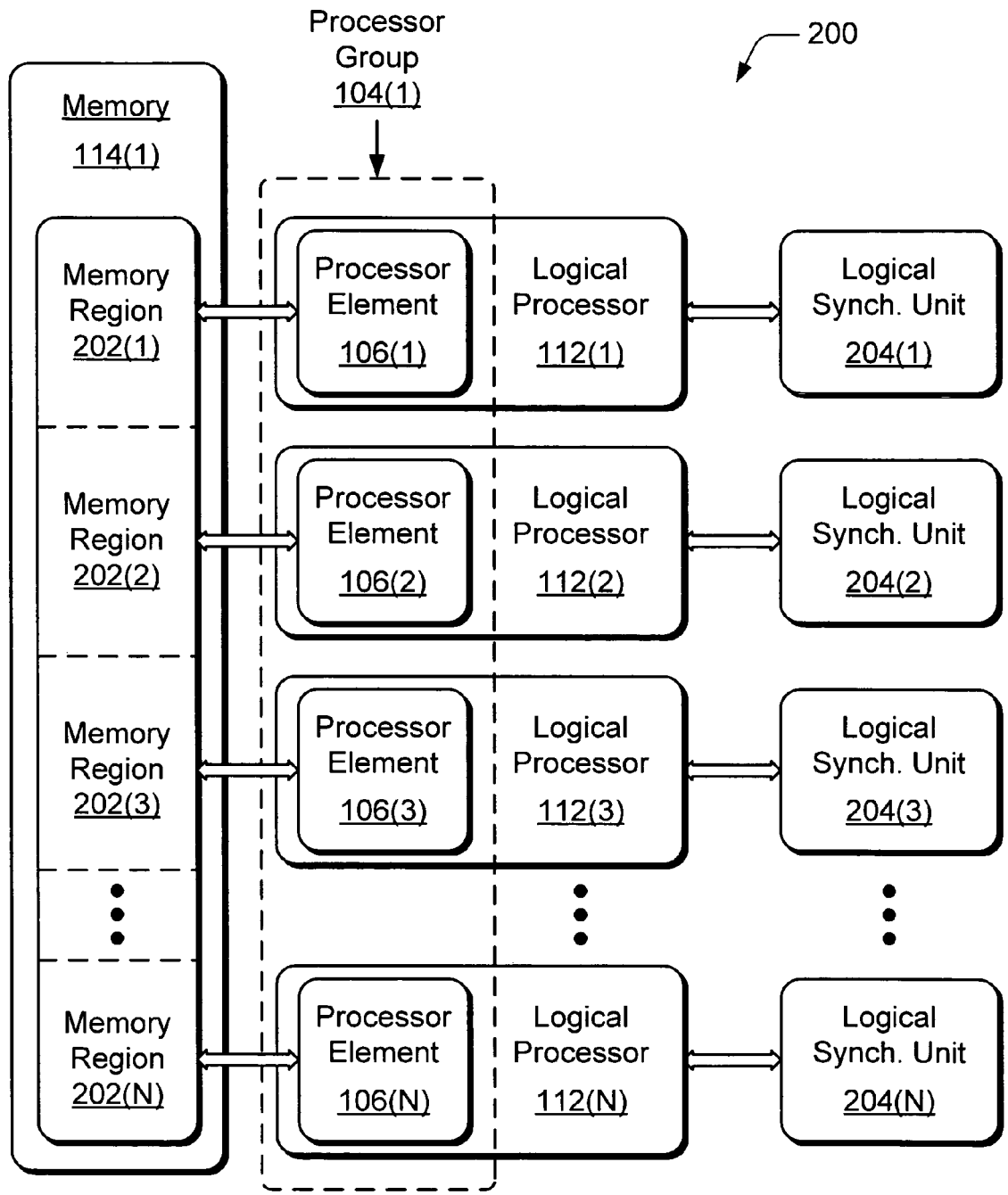
FIG. 2 further illustrates various components of the exemplary redundant processor system shown in FIG. 1.

FIG. 2 further illustrates various components 200 of the redundant processor system 100 shown in FIG. 1. The processor elements 106(1-N) of processor group 104(1) are shown, one each of a respective logical processor 112(1-N). Each processor element 106(1-N) is associated with a respective memory region 202(1-N) of the memory component 114(1) for data storage. The memory component 114(1) associated with processor group 104(1) is partitioned among the processor elements 106(1-N) of the processor group 104(1). In an alternate embodiment, each memory region 202(1-N) can be implemented as an independent, separate memory for data storage. Although not shown, the processor elements 108(1-N) of processor group 104(2) are each associated with a respective partitioned memory region of the memory component 114(2). Similarly, the processor elements 110(1-N) of processor group 104(3) are each associated with a respective partitioned memory region of the memory component 114(3).

Each of the logical processors 112(1-N) correspond to one or more respective logical synchronization units 204(1-N). A logical synchronization unit 204 performs various rendezvous operations for an associated logical processor 112 to achieve agreements on synchronization issues between the processor elements that cooperate to form a logical processor 112. For example, input/output operations and/or interprocessor communications can be communicated from each processor element of a logical processor 112 to an associated logical synchronization unit 204 to compare and vote on the input/output operations and/or interprocessor communications generated by the processor elements.

A rendezvous operation may further be implemented by a logical synchronization unit 204 to exchange state information and/or data among the processor elements of a logical processor 112 to synchronize operations and responses of the processor elements. For example, a rendezvous operation may be implemented such that the processor elements deterministically respond to incoming asynchronous interrupts, to accommodate varying processing rates of the processor elements, to exchange software state information when performing operations that are distributed across the processor elements, and the like.

Figure 3:
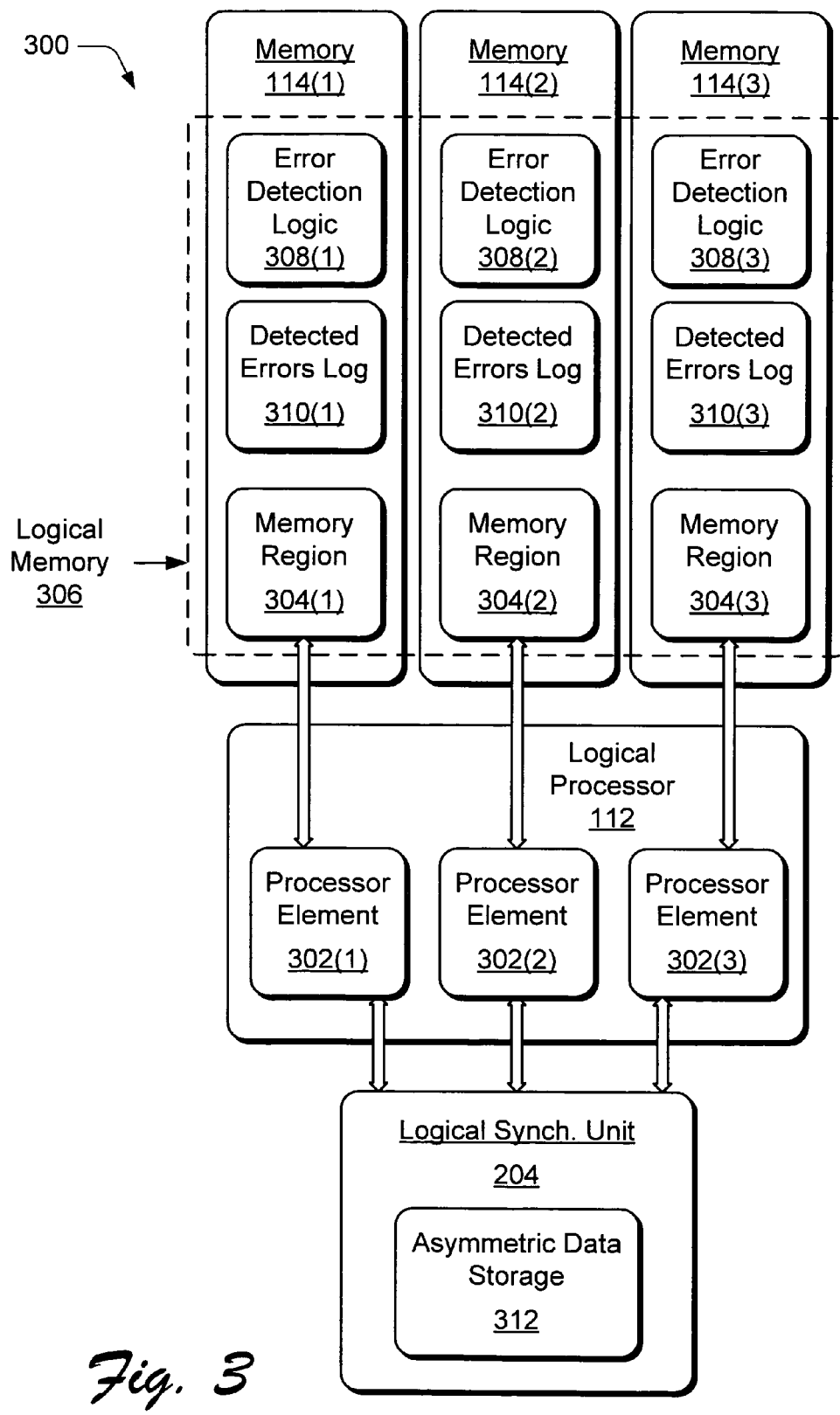
FIG. 3 illustrates various components of an exemplary redundant processor system in which embodiments of latent error detection can be implemented.

FIG. 3 illustrates various components of an exemplary redundant processor system 300 in which embodiments of latent error detection can be implemented. The redundant processor system 300 includes various components of the redundant processor system 100 shown in FIGS. 1 and 2, such as the multiple logical processors 112(1-N) and the associated logical synchronization units 204(1-N). For illustration, however, only one logical processor 112 and one associated logical synchronization unit 204 is shown in FIG. 3.

The logical processor 112 includes processor elements 302(1-3) which are each a microprocessor that executes, or processes, computer executable instructions. The redundant processor system 300 includes the memory components 114(1-3) that are each associated with a respective processor group 104(1-3) as shown in FIG. 1. Each of the processor elements 302(1-3) are one of the processor elements in a respective processor group, and each processor element 302 is associated with a partitioned memory region in a respective memory component 114(1-3). For example, processor element 302(1) corresponds to memory region 304(1) in memory component 114(1), processor element 302(2) corresponds to memory region 304(2) in memory component 114(2), and processor element 302(3) corresponds to memory region 304(3) in memory component 114(3).

The memory regions 304(1-3) form a logical memory 306 that corresponds to logical processor 112. The processor elements 302(1-3) of the logical processor 112 each correspond to a respective partitioned memory region 304(1-3) of the logical memory 306.

The memory components 114(1-3) each include error detection logic 308(1-3) and a detected errors log 310(1-3) that correspond to a respective processor element 302(1-3) of the logical processor 112. In this example, the error detection logic 308(1-3) is implemented as a software application and is stored in the memory components 114(1-3). Each of the processor elements 302(1-3) execute an instantiation of the error detection logic 308 (e.g., as software) to implement latent error detection.

As used herein, the term "logic" (e.g., the error detection logic 308, or components thereof) can also refer to hardware, firmware, software, or any combination thereof that may be implemented to perform the logical operations associated with latent error detection. Logic may also include any supporting circuitry utilized to complete a given task including supportive analog operations. For example, logic may also include analog circuitry, memory components, input/output (I/O) circuitry, interface circuitry, power providing/regulating circuitry, and the like.

The error detection logic 308(1-3) scans the respective memory regions 304(1-3) for latent processing errors and/or latent memory errors that are maintained in the logical memory 306. The error detection logic 308 also detects latent errors before one of the processor elements 302(1-3) fails or malfunctions and needs to be replaced. When a processor element 302 fails and is replaced along with an associated memory region, one of the remaining two memory regions 304 is copied into the replaced memory region. If a latent error is not detected in one of the remaining two memory regions 304 before the failed processor element and the associated memory region are replaced, it can not be determined which of the data in the remaining two memory regions 304 is correct if the data does not agree.

A latent processing error may be introduced into memory region 304(1), for example, when associated processor element 302(1) executes an instruction set and outputs a value, data, or a state that is different from the outputs of processor elements 302(2) and 302(3) which each execute the same instruction set. The processing error is then stored in memory region 304(1) unnoticed and latent.

Additionally, a latent memory error can be introduced into a memory region 304 as a data corruption error in the memory region itself. Latent memory errors are commonly referred to as correctable memory errors and uncorrectable memory errors, and are identified in memory by an error correcting code. Correctable memory errors can be single-bit errors and are correctable because the single erroneous bit can be identified and corrected according to the error correcting code. In alternative embodiments, the error correcting code can be implemented to both detect and correct some multiple-bit errors.

An uncorrectable memory error is labeled as such because of a multiple-bit error that can not be corrected with a particular error correcting code. However, in an embodiment of latent error detection, both correctable and so-called "uncorrectable" memory errors, as well as detected latent processing errors, can all be corrected. Unlike a latent memory error, a latent processing error can not be detected by the error correcting code because a processing error occurs prior to the computation of the error correcting code. A latent memory error can be detected by the error correcting code because the error occurs after the computation of the error correcting code.

The error detection logic 308(1-3) for each respective processor element 302(1-3) periodically scans the memory regions 304(1-3) for latent processing errors and latent memory errors. In an embodiment, the error detection logic 308(1-3) can be implemented to scan the respective memory regions 304(1-3) on a daily basis (e.g., once every 24 hours), and can be executed as a background process so as not to excessively burden processing resources.

When the error detection logic 308 detects a single-bit latent memory error (e.g., a "correctable" memory error) identified in a respective memory region 304(1-3) by an error correcting code, the latent memory error is resolved according to the error correcting code. When the error detection logic 308(1), for example, detects a multiple-bit latent memory error (e.g., a so-called "uncorrectable" memory error) identified in memory region 304(1) by an error correcting code, the latent memory error is resolved by copying data from the second memory region 304(2) into the first memory region 304(1).

Similarly, when the error detection logic 308(1) detects a latent processing error in memory region 304(1), for example, the error detection logic 308 can initiate a comparison of the data in the second memory region 304(2) to the data in the third memory region 304(3) to determine that the data is identical, and then copy the data to the first memory region 304(1) to resolve the latent processing error. In an embodiment, the logical synchronization unit 204 compares the redundant data from the memory regions 304(1-3) and by a voting operation (e.g., ⅔), determines which is the correct data and which is the erroneous data.

In an embodiment of latent error detection, the error detection logic 308(1-3) reads only a small portion of each redundant memory region 304(1-3) at any one time for latent error detection. The error detection logic 308(1-3) reads data from a memory block in each of the respective memory regions 304(1-3), such as one cache line or one kilobyte of data. In another embodiment, the error detection logic 308(1-3) generates a checksum of the data read for comparison from each of the respective memory regions 304(1-3). The checksums are then exchanged for comparison through the logical synchronization unit 204 because the checksums can be exchanged and compared faster than the data itself. Any applicable checksum can be implemented by the error detection logic 308(1-3), such as a modified Fletcher checksum, a cyclical redundancy checksum, and/or any other checksum that may be selected based on performance, size, errors to protect against, and the like.

To increase performance in an event that a latent error is detected, the error detection logic 308(1-3) can also be implemented to binary search a detected latent processing error to narrow the focus when comparing the redundant data from the memory regions 304(1-3). The error detection logic 308 can binary search the detected latent processing error down to sixteen or eight bytes, for example, and then isolate which word includes the latent processing error.

In another embodiment, the error detection logic 308(1-3) re-scans a detected latent processing error to verify that the detected latent processing error is not due to an asynchronous memory access input/output operation. If a memory location in memory region 304(1), for example, is subject to a direct memory access at the particular moment that the error detection logic 308(1) reads the memory location, the data may not compare to the data read from the other redundant memory regions 304(2) and 304(3). Even though the data in memory region 304(1) is not incorrect or erroneous, it may be temporarily detected as incorrect due to a coincidental (in time) direct memory access operation. If the error detection logic 308(1) does not detect a latent processing error on the re-scan of the memory location, then the error detection logic 308(1) continues on to scan another memory location of the redundant memory region 304(1).

The error detection logic 308(1-3) can initiate a re-scan for a detected latent processing error at various times after detecting the latent processing error. For example, the error detection logic 308 can initiate a re-scan immediately after detecting the latent processing error, or can pause the scan process for a time interval (e.g., one to five milliseconds, for example) and then initiate the re-scan. In an alternate and/or additional embodiment, the error detection logic 308(1-3) can log the detected latent processing error in the respective detected errors log 310(1-3) and then re-scan the logged error at the scheduled scan interval (e.g., within the next 24 hours).

The logical synchronization unit 204 includes an asymmetric data storage 312 that provides the processor elements 302(1-3) a memory area to exchange or store data that may be expected to be different between the processor elements. The asymmetric data storage 312 can include a set of registers for each processor element 302(1-3) of logical processor 112, and each processor element 302(1-3) can read from and write to its own set of registers, as well as read from the registers corresponding to the other processor elements. Further, although the asymmetric data storage 312 is depicted as a single data storage area of the logical synchronization unit 204, the asymmetric data storage 312 may be implemented as independent data storage areas.

Methods for latent error detection, such as exemplary methods 400 and 500 described with reference to FIGS. 4 and 5, respectively, may be described in the general context of computer executable instructions. Generally, computer executable instructions include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 4:
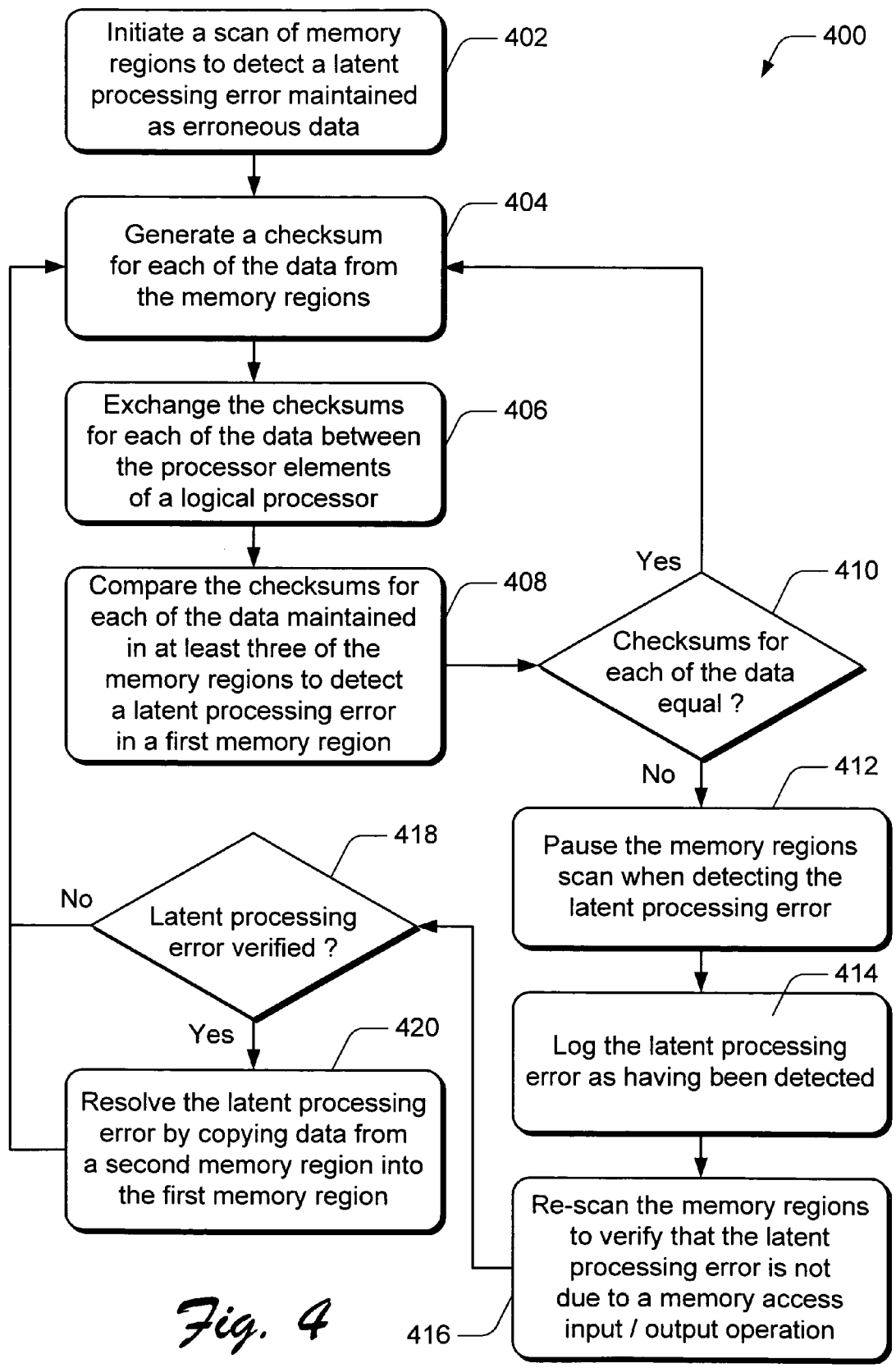
FIG. 4 is a flow diagram that illustrates an embodiment of a method for latent error detection.

FIG. 4 illustrates an embodiment of a method 400 for latent error detection. The order in which the method is described is not intended to be construed as a limitation, and any number of the described method blocks may be combined in any order to implement the method. Furthermore, the method can be implemented in any suitable hardware, software, firmware, or combination thereof.

At block 402, a scan of memory regions is initiated to detect a latent processing error maintained as erroneous data. For example, each of the memory regions 304(1-3) corresponds to a respective different processor element 302(1-3) of the logical processor 112 in the redundant processor system 300 (FIG. 3). A scan of the redundant memory regions 304(1-3) is initiated by the respective error detection logic 308(1-3) to detect latent processing errors.

At block 404, a checksum is generated for each of the data from the memory regions. For example, the error detection logic 308(1-3) generates a checksum of the data read for comparison from each of the respective memory regions 304(1-3). At block 406, the checksums for each of the data is exchanged between the processor elements of a logical processor. For example, each processor element 302(1-3) of logical processor 112 exchanges the checksum of the data from a respective memory region 304(1-3) with each of the other processor elements 302.

At block 408, the data maintained in at least three of the memory regions is compared to detect the latent processing error in a first memory region. For example, the error detection logic 308(1-3) initiates a comparison of the checksums to detect the latent processing error in one of the memory regions 304(1-3). Further, the error detection logic 308(1-3) can binary search a detected latent processing error to narrow the focus when comparing the redundant data from the memory regions 304(1-3). In an alternate embodiment, the data itself (rather than checksums of the data) is exchanged between the processor elements 302(1-3) and the data is compared to detect a latent processing error.

At block 410, a determination is made as to whether the checksums for each of the data compared at block 408 is equal (e.g., the same or logically the same). If the checksums are determined to be the same (i.e., "yes" from block 410), then the scan of the memory regions continues with data from a next memory area at block 404 as described above.

If the checksums are determined not to be the same (i.e., "no" from block 410), then the scanning is paused at block 412 when detecting the latent processing error, and at block 414, the latent processing error is logged as having been detected. For example, the error detection logic 308(1-3) can log the detected latent processing error in the respective detected errors log 310(1-3).

At block 416, the memory regions are re-scanned when detecting the latent processing error to verify that the latent processing error is not due to a memory access input/output operation. For example, the error detection logic 308(1-3) can initiate a re-scan for a detected latent processing error at various times after detecting the latent processing error, such as immediately, after a pause of a few milliseconds, or re-scan the logged error at the next scheduled scan interval.

At block 418, a determination is made as to whether the latent processing error detected at block 410 is verified at block 418 as a latent processing error, and is not due to a memory access input/output operation. If the latent processing error is verified as such (i.e., "yes" from block 418), then the latent processing error is resolved by copying data from a second memory region into the first memory region at block 420. For example, data is copied from a second memory region 304(2) into the first memory region 304(1) if a latent processing error is detected in the first memory region 304(1). The error detection logic 308 can initiate a comparison of the data in the second memory region 304(2) to the data in the third memory region 304(3) to determine that the data is identical, and then copy the data to the first memory region 304(1) to resolve the latent processing error.

If the re-scan at block 416 does not verify a latent processing error (i.e., "no" from block 418), then the scan of the memory regions continues at block 404 as described above. Additionally, after a latent processing error is resolved at block 420, the scan of the memory regions may also continue at block 404 as described above. In alternate embodiments after blocks 410, 418 and/or block 420, the error detection logic 308(1-3) can initiate a scan of the respective memory regions 304(1-3) for a latent memory error as described with reference to FIG. 5.

Figure 5:
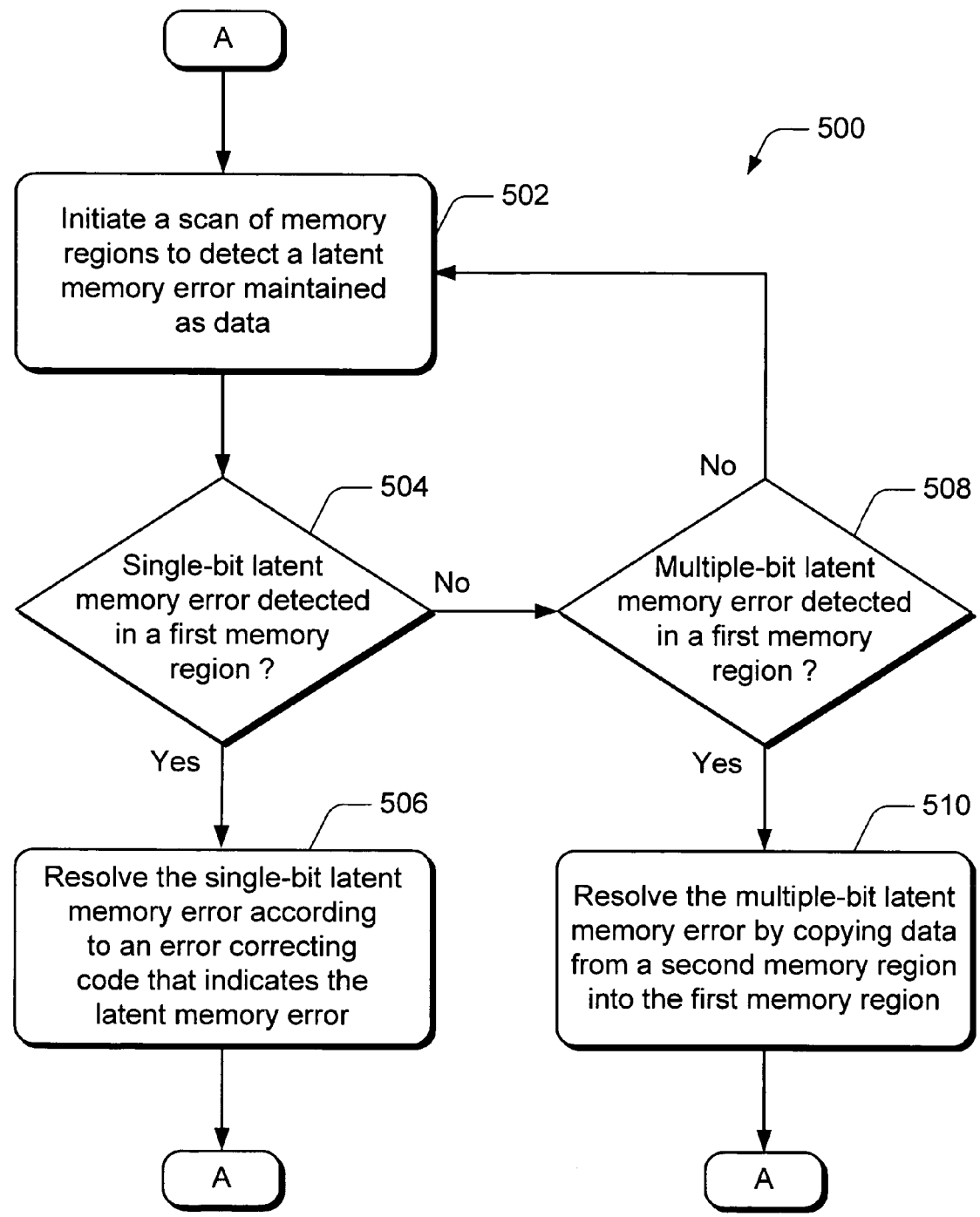
FIG. 5 is a flow diagram that illustrates an embodiment of a method for latent error detection.

FIG. 5 illustrates an embodiment of a method 500 for latent error detection. The order in which the method is described is not intended to be construed as a limitation, and any number of the described method blocks may be combined in any order to implement the method. Furthermore, the method can be implemented in any suitable hardware, software, firmware, or combination thereof.

At block 502, a scan of memory regions is initiated to detect a latent memory error maintained as data in a memory region. For example, error detection logic 308(1-3) scans the respective memory regions 304(1-3) for single-bit data errors and/or multiple-bit data errors which are identified in a memory region by an error correcting code.

At block 504, a determination is made as to whether an error is detected as a single-bit latent memory error. If a single-bit latent memory error is detected (i.e., "yes" from block 504), then the latent memory error is resolved according to an error correcting code that indicates the latent memory error at block 506. For example, the error detection logic 308 resolves a single-bit latent memory error according to an error correcting code that indicates the latent memory error.

If a single-bit latent memory error is not detected (i.e., "no" from block 504), then a determination is made as to whether an error is detected as a multiple-bit latent memory error at block 508. If a multiple-bit latent memory error is not detected (i.e., "no" from block 508), then the scan of the memory regions can continue at block 502 as described above. If a multiple-bit latent memory error is detected (i.e., "yes" from block 508), then the multiple-bit latent memory error is resolved by copying data from a second memory region into the first memory region at block 510.

Although embodiments of latent error detection have been described in language specific to structural features and/or methods, it is to be understood that the subject of the appended claims is not necessarily limited to the specific features or methods described. Rather, the specific features and methods are disclosed as exemplary implementations of latent error detection.

The invention claimed is:

1. A redundant processor system, comprising:
   processor elements of a logical processor each configured to execute a set of instructions and generate a same data output;
   memory regions each associated with a different processor element and configured to maintain the data output of a processor element; and
   error detection logic configured to scan the memory regions for a latent processing error maintained in a memory region as an erroneous data output from a processor element;
   wherein the error detection logic is further configured to:
   detect the latent processing error in the memory region; and re-scan the memory regions to verify that the detected latent processing error is not due to a memory access input/output operation.

2. A redundant processor system as recited in claim 1, wherein the error detection logic is further configured to compare data maintained in at least three of the memory regions to detect the latent processing error.

3. A redundant processor system as recited in claim 1, wherein the error detection logic is further configured to:
   detect the latent processing error in a first memory region; and
   resolve the latent processing error by copying data from a second memory region into the first memory region, wherein the data maintained in the second memory region is determined to be identical to data maintained in at least a third memory region.

4. A redundant processor system as recited in claim 1, wherein the error detection logic is further configured to:
   read data from a memory block in each of the memory regions;
   generate a checksum for each of the data from the memory blocks; and
   compare the checksums to detect the latent processing error.

5. A redundant processor system as recited in claim 1, wherein the error detection logic is further configured to:
   read data from a memory block in each of the memory regions;
   generate a checksum for each of the data from the memory blocks;
   compare the checksums to detect the latent processing error in a first memory region; and
   resolve the latent processing error by copying data from a second memory region into the first memory region, wherein the data maintained in the second memory region is determined to be identical to data maintained in at least a third memory region.

6. A redundant processor system as recited in claim 1, further comprising a logical synchronization unit configured to coordinate data comparisons, and wherein the error detection logic is further configured to:
   read data from a memory block in each of the memory regions;
   generate a checksum for each of the data from the memory blocks; and
   request a comparison operation of the checksums from the logical synchronization unit to detect the latent processing error.

7. A redundant processor system as recited in claim 1, wherein each of the processor elements are further configured to:
   generate a checksum for data read from a memory block in a respective memory region; and
   compare the checksums to detect the latent processing error.

8. A redundant processor system as recited in claim 1, wherein each of the processor elements are further configured to:
   generate a checksum for data read from a memory block in a respective memory region;
   compare the checksums to detect the latent processing error in a first memory region; and
   resolve the latent processing error by copying data from a second memory region into the first memory region, wherein the data maintained in the second memory region is determined to be identical to data maintained in at least a third memory region.

9. A redundant processor system as recited in claim 1, further comprising a logical synchronization unit, and wherein each of the processor elements are further configured to:
   generate a checksum for data read from a memory block in a respective memory region; and
   request a comparison operation of the checksums from the logical synchronization unit to detect the latent processing error.

10. A redundant processor system as recited in claim 1, further comprising a logical synchronization unit, and wherein:
    each of the processor elements are further configured to execute an instantiation of the logic to generate checksums for data read from a memory block in the respective memory regions;
    the logical synchronization unit is configured to exchange the checksums between the processor elements; and
    each of the processor elements are further configured to compare the exchanged checksums to detect the latent processing error.

11. A redundant processor system as recited in claim 1, wherein the error detection logic is further configured to:
    scan the memory regions for a multiple-bit latent memory error maintained as data in a first memory region; and
    resolve the multiple-bit latent memory error by copying data from a second memory region into the first memory region.

12. A redundant processor system as recited in claim 1, wherein the error detection logic is further configured to:
    scan the memory regions for latent memory errors maintained as erroneous data;
    resolve a single-bit latent memory error according to an error correcting code that indicates the single-bit latent memory error; and
    resolve a multiple-bit latent memory error in a first memory region by copying data from a second memory region into the first memory region.

13. An error detection system comprising error detection logic configured to scan memory blocks each corresponding to a different processor element of a redundant processor system, the error detection logic configured to scan for a latent processing error maintained as erroneous data in a first memory block, the error detection logic further configured to resolve the latent processing error by copying data from a second memory block into the first memory block where the data maintained in the second memory block is verified identical to data maintained in at least a third memory block, wherein the error detection logic is further configured to re-scan the memory blocks to verify that the latent processing error is not due to a memory access input/output operation.

14. An error detection system as recited in claim 13, wherein the error detection logic is further configured to compare data from at least three of the memory blocks to detect the latent processing error in the first memory block.

15. An error detection system as recited in claim 13, wherein the error detection logic is further configured to:
generate a checksum for each of the data from the memory blocks; and
compare the checksums to detect the latent processing error in the first memory block.

16. An error detection system as recited in claim 13, wherein the error detection logic is further configured to:
scan the memory blocks for a multiple-bit latent memory error maintained as erroneous data in the first memory block; and
resolve the multiple-bit latent memory error by copying data from the second memory block into the first memory block.

17. An error detection system as recited in claim 13, wherein the error detection logic is further configured to:
scan the memory blocks for latent memory errors maintained as erroneous data;
resolve a single-bit latent memory error according to an error correcting code that indicates the single-bit latent memory error; and
resolve a multiple-bit latent memory error in a first memory block by copying data from a second memory block into the first memory block.

18. A method, comprising:
scanning for a latent processing error maintained as erroneous data in memory regions that each correspond to a different processor element of a redundant processor system;
comparing the data maintained in the memory regions to detect the latent processing error in a first memory region;
re-scanning the memory regions when the latent processing error is detected to verify that the latent processing error is not due to a memory access input/output operation; and
resolving the latent processing error by copying data from a second memory region into the first memory region where the data maintained in the second memory region is determined to be identical to data maintained in at least a third memory region.

19. A method as recited in claim 18, further comprising:
pausing the scanning when the latent processing error is detected; and
re-scanning the memory regions after pausing the scanning to verify that the latent processing error is not due to a memory access input/output operation.

20. A method as recited in claim 18, further comprising:
logging the latent processing error as having been detected;
re-scanning the memory regions to verify that the logged latent processing error was not due to a memory access input/output operation; and
wherein resolving the latent processing error includes resolving the latent processing error after re-scanning the memory regions and verifying the logged latent processing error.

21. A method as recited in claim 18, further comprising generating a checksum for each of the data maintained in the memory regions, and wherein comparing includes comparing the checksums to detect the latent processing error in the first memory region.

22. A method as recited in claim 18, further comprising:
scanning the memory regions for latent memory errors maintained as erroneous data in a memory region;
resolving a single-bit latent memory error according to an error correcting code that indicates the single-bit latent memory error; and
resolving a multiple-bit latent memory error in the first memory region by copying data from the second memory region into the first memory region.

23. A method as recited in claim 18, further comprising:
scanning the memory regions for a multiple-bit latent memory error maintained as erroneous data in the first memory region; and
resolving the multiple-bit latent memory error by copying data from the second memory region into the first memory region.

24. A method as recited in claim 18, wherein comparing includes binary searching the data maintained in the memory regions to reduce the data for comparison, and comparing the reduced data to detect the latent processing error.

25. A method as recited in claim 18, wherein comparing includes:
binary searching the data maintained in the memory regions to reduce the data for comparison;
generating a checksum for each of the reduced data from the memory regions; and
comparing the checksums to detect the latent processing error in the first memory region.

26. One or more computer-readable media comprising computer executable instructions that, when executed, direct an error detection system to:
scan for a latent processing error in memory regions that each correspond to a different processor element of a redundant processor system;
compare the data maintained in the memory regions to detect the latent processing error;
re-scan the memory regions to verify that the latent processing error is not due to a memory access input/output operation; and
resolve the latent processing error if the re-scan verifies that the latent processing error is not due to the memory access input/output operation.

27. One or more computer-readable media as recited in claim 26, further comprising computer executable instructions that, when executed, direct the error detection system to copy data from a first memory region into a second memory region to resolve the latent processing error, wherein the data maintained in the first memory region is determined to be identical to data maintained in at least a third memory region.

28. One or more computer-readable media as recited in claim 26, further comprising computer executable instructions that, when executed, direct the error detection system to:
log that the latent processing error has been detected;

re-scan the memory regions as a scheduled scan of the memory regions; and resolve the logged latent processing error if the scheduled scan verifies that the logged latent processing error is not due to the memory access input/output operation.

29. One or more computer-readable media as recited in claim 26, further comprising computer executable instructions that, when executed, direct the error detection system to generate a checksum for each of the data maintained in the memory regions, and compare the checksums to detect the latent processing error.

30. One or more computer-readable media as recited in claim 26, further comprising computer executable instructions that, when executed, direct the error detection system to:

scan the memory regions for latent memory errors;

resolve a single-bit latent memory error according to an error correcting code that indicates the latent memory error; and resolve a multiple-bit latent memory error in a first memory region by copying data from a second memory region into the first memory region.

31. One or more computer-readable media as recited in claim 26, further comprising computer executable instructions that, when executed, direct the error detection system to scan the memory regions for a multiple-bit latent memory error in a first memory region, and copy data from a second memory region into the first memory region to resolve the multiple-bit latent memory error.

32. An error detection system, comprising:

means to scan for a latent processing error maintained as erroneous data in memory regions that each correspond to a different processor element of a redundant processor system;

means to compare the data maintained in the memory regions to detect the latent processing error in a first memory region;

means to re-scan the first memory region to verify that the latent processing error is not due to a memory access input/output operation; and means to resolve the latent processing error by copying data from a second memory region into the first memory region where the data maintained in the second memory region is determined to be identical to data maintained in at least a third memory region.

33. An error detection system as recited in claim 32, further comprising:

means to pause the scan when the latent processing error is detected; and means to re-scan the first memory region to verify that the latent processing error is not due to a memory access input/output operation.

34. An error detection system as recited in claim 32, further comprising:

means to log the latent processing error as having been detected; and means to re-scan the first memory region to verify that the logged latent processing error was not due to a memory access input/output operation.

35. An error detection system as recited in claim 32, further comprising:

means to generate a checksum for each of the data maintained in the memory regions; and means to compare the checksums to detect the latent processing error in the first memory region.

36. An error detection system as recited in claim 32, further comprising:

means to scan for latent memory errors maintained as erroneous data in the memory regions;

means to resolve a single-bit latent memory error according to an error correcting code that indicates the single-bit latent memory error; and means to resolve a multiple-bit latent memory error in the first memory region by copying data from the second memory region into the first memory region.

37. An error detection system as recited in claim 32, further comprising:

means to scan for a multiple-bit latent memory error maintained as erroneous data in the memory regions; and means to resolve the multiple-bit latent memory error in the first memory region by copying data from the second memory region into the first memory region.

38. An error detection system as recited in claim 32, wherein the means to scan for the latent processing error includes error detection logic.

39. An error detection system as recited in claim 32, wherein the means to compare the data includes a logical synchronization unit.

* * * * *